(12) United States Patent
Reyes et al.

(10) Patent No.: US 10,040,989 B2
(45) Date of Patent: Aug. 7, 2018

(54) CALCIUM METHYLGLYCINE DIACETIC ACID SALT PARTICLES AND SUBTERRANEAN OPERATIONS RELATING THERETO

(71) Applicant: Halliburton Energy Services, Inc., Houston, TX (US)

(72) Inventors: Enrique Antonio Reyes, Tomball, TX (US); Christopher Lynn Smith, Kingwood, TX (US); Alyssa Smith, Humble, TX (US); Aaron Michael Beuterbaugh, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 127 days.

(21) Appl. No.: 14/908,570

(22) PCT Filed: Nov. 27, 2013

(86) PCT No.: PCT/US2013/072118
§ 371 (c)(1),
(2) Date: Jan. 29, 2016

(87) PCT Pub. No.: WO2015/080713
PCT Pub. Date: Jun. 4, 2015

(65) Prior Publication Data
US 2016/0208160 A1   Jul. 21, 2016

(51) Int. Cl.
*C09K 8/72* (2006.01)
*C09K 8/68* (2006.01)
(Continued)

(52) U.S. Cl.
CPC .................. *C09K 8/72* (2013.01); *C09K 8/68* (2013.01); *C09K 8/70* (2013.01); *C09K 8/74* (2013.01); *C09K 8/92* (2013.01); *E21B 43/16* (2013.01)

(58) Field of Classification Search
CPC ............... C09K 8/72; C09K 8/68; C09K 8/70
(Continued)

(56) References Cited

U.S. PATENT DOCUMENTS

| 2011/0259592 A1 | 10/2011 | Reyes |
| 2011/0263472 A1 | 10/2011 | Somerville Roberts et al. |

(Continued)

FOREIGN PATENT DOCUMENTS

| EP | 0005216 A1 | 11/1979 |
| WO | 2006/054261 A2 | 5/2006 |

(Continued)

OTHER PUBLICATIONS

Magee et al., Method for Effective Fluid Diversion When Performing a Matrix Acid Stimulation in Carbonate Formations, SPE 37736, 1997.

(Continued)

*Primary Examiner* — William D Hutton, Jr.
*Assistant Examiner* — Ashish K Varma
(74) *Attorney, Agent, or Firm* — McDermott Will & Emery LLP

(57) ABSTRACT

Particles that comprise calcium methylglycine diacetic acid salt ("Ca-MGDA salt") may be useful for fluid diversion in subterranean operations. In some instances, the particles may be formed in the subterranean formation. For example, a method may involve introducing a treatment fluid into a wellbore penetrating a subterranean formation, wherein the treatment fluid comprises an aqueous base fluid, MGDA or salt thereof, and an acid in an amount of about 3% or greater by weight of the aqueous base fluid; acidizing a portion of the subterranean formation comprising calcium carbonate resulting in a concentration of calcium in the treatment fluid that exceeds about 50,000 ppm; and precipitating a plurality of particles that comprise a Ca-MGDA salt in the portion of (Continued)

the subterranean formation, thereby reducing fluid flow therethrough. In some instances, the particles that comprise Ca-MGDA salt may be included in a treatment fluid before introduction into the subterranean formation.

17 Claims, 14 Drawing Sheets

(51) Int. Cl.

| | | |
|---|---|---|
| *C09K 8/70* | (2006.01) | |
| *C09K 8/74* | (2006.01) | |
| *C09K 8/92* | (2006.01) | |
| *E21B 43/16* | (2006.01) | |

(58) Field of Classification Search
USPC .......................................................... 166/307
See application file for complete search history.

(56) References Cited

U.S. PATENT DOCUMENTS

| | | | | |
|---|---|---|---|---|
| 2012/0097392 A1* | 4/2012 | Reyes | ....................... | C02F 5/12 166/279 |
| 2013/0213657 A1 | 8/2013 | Dobson, Jr. et al. | | |
| 2013/0264060 A1* | 10/2013 | De Wolf | ................ | C09K 8/528 166/305.1 |

FOREIGN PATENT DOCUMENTS

| | | |
|---|---|---|
| WO | 2006085132 A1 | 8/2006 |
| WO | 2015080713 A1 | 6/2015 |

OTHER PUBLICATIONS

Chang et al., A Novel Self-Diverting-Acid Developed for Matrix Stimulation of Carbonate Reservoirs, SPE 65033, 2001.

Johnson et al., Carbonate Production Decline Rates are Reduced Through Improvements in Gelled Acid Technology, SPE 17297, 1988.

Saxon et al., An Effective Matrix Diversion Technique for Carbonate Formations, SPE 62173, 2000.

International Search Report and Written Opinion for PCT/US2013/072118 dated Aug. 25, 2014.

\* cited by examiner

CALCIUM METHYLGLYCINE DIACETIC ACID SALT PARTICLES AND SUBTERRANEAN OPERATIONS RELATING THERETO

BACKGROUND

The embodiments described herein relate to calcium methylglycine diacetic acid salt ("Ca-MGDA salt") particles including the production thereof and implementation in subterranean operations.

Treatment fluids can be used in a variety of subterranean treatment operations. Such treatment operations can include, without limitation, drilling operations, stimulation operations, production operations, remediation operations, sand control treatments, and the like. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid or a component thereof, unless otherwise specified herein. More specific examples of illustrative treatment operations can include drilling operations, fracturing operations, gravel packing operations, acidizing operations, scale dissolution and removal operations, sand control operations, consolidation operations, and the like.

Diverting agents may be used in a variety of treatment fluids for subterranean operations. Such operations include, but are not limited to, drilling, stimulation treatments (e.g., fracturing treatments and matrix acidizing treatments), and cementing operations. Traditionally, treatment fluids used for diverting include a viscous liquid or a plurality of particles that are placed in portions of the formation with greatest permeability. Once in that portion of the formation, the viscous fluid or particles physical/mechanical reduce fluid flow therethrough, thereby diverting the remaining treatment fluid or a subsequent treatment fluid to another portion of the subterranean formation.

After the treatment is complete and diversion is no longer needed, fluid flow may be returned to that portion of the formation by reducing the viscosity of the viscous fluid or removing the diverting particles. Typically, an acidic solution (e.g., greater than about 5% HCl) is used to reduce the viscosity of the fluid or degrade particulate diverting agents. However, conventional diverting agents may be difficult to remove completely from the subterranean formation, which can leave a residue in the subterranean formation. This residue may permanently reduce the permeability of the formation (e.g., between about 5% and about 40% and in some instances a 100% permanent reduction in permeability). In turn, the production of hydrocarbons, and thereby profitability of the well, may be reduced.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
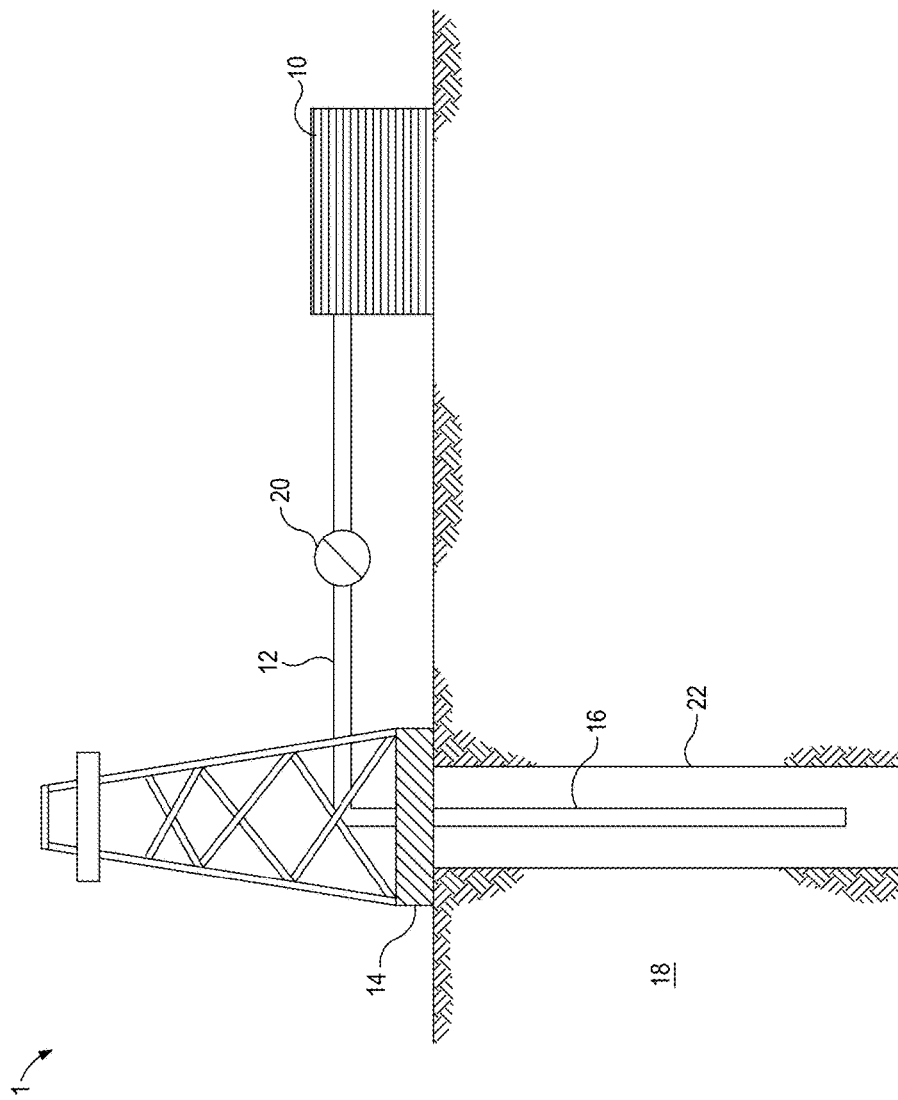
FIG. 1 provides an illustrative schematic of a system that can deliver treatment fluids of the present disclosure to a downhole location, according to one or more embodiments.

The embodiments described herein relate to Ca-MGDA salt particles including the production thereof and implementation in subterranean operations. For clarity and brevity, as used herein, the term "Ca-MGDA salt particles" refers to particles that comprise a Ca-MGDA salt.

The Ca-MGDA salt particles described herein may be useful as diverting agents in downhole applications. Generally, the Ca-MGDA salt particles are formed by precipitation, which, in some instances, can be performed in the subterranean formation. For example, the Ca-MGDA salt particles may be formed by precipitation reaction between acidic MGDA (or a salt thereof) and calcium ions, which may be produced during an acidizing operation in a calcium carbonate containing subterranean formation. As the calcium carbonate is etched from the formation and Ca-MGDA salt particles precipitate, the Ca-MGDA salt particles may divert additional fluid to other portions of the formation, which may advantageously provide a more homogenous acidizing of the formation.

The Ca-MGDA salt particles provide additional advantages because they are sensitive to pH and degrade above about pH 5.5. As used herein, the terms "degrade" and/or "degradable" refer to the conversion of materials into smaller components, intermediates, or end products by the result of dissolution, hydrolytic degradation, biologically formed entities (e.g., bacteria or enzymes), chemical reactions, thermal reactions, or reactions induced by radiation. Without being limited by theory, it is believed that the Ca-MGDA salt particles described herein degrade primarily via dissolution when the pH is increased above 5.5. Because of the pH at which the Ca-MGDA salt particles degrade, degradation can may advantageously be achieved with water, brine, or a weakly acidic solution as opposed to a stronger acidic solution used with traditional diverting agents.

The degradation of the Ca-MGDA particles may, in some instances, be complete degradation to MGDA (or a salt thereof) and calcium ions as degradation products. Because the degradation products are molecules, ions, and the like, degradation may leave little to no residue in the formation. Degradation of the Ca-MGDA particles has been observed to be fast to near instantaneous, which reduces the time and cost for performing an operation to return fluid flow through portions of the formation plugged with the Ca-MGDA salt particles.

It should be noted that when "about" is used herein at the beginning of a numerical list, "about" modifies each number of the numerical list. Further, in some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, particle sizes, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

Generally, the Ca-MGDA salt particles described herein may be formed by a precipitation reaction that occurs when a fluid is prepared to have a pH of about 1.5 to about 5.5 and comprise an aqueous base fluid, MGDA or salt thereof, and calcium in a concentration of greater than about 50,000 ppm. In some instances, the MGDA (or a salt thereof) concentration may be about 0.5 M to about 1.5 M. In some instances, precipitation of the Ca-MGDA salt particles may be initiated by raising the concentration of calcium in the fluid to greater than about 50,000 ppm. In some instances, precipitation of the Ca-MGDA salt particles may be initiated by adjusting the pH of the fluid to be about 1.5 to about 5.5. In some instances, a combination of the foregoing may be implemented.

In some embodiments, the Ca-MGDA salt particles described herein may be used in a subterranean operation (e.g., for fluid diversion or fluid loss control). In some instances, the Ca-MGDA salt particles may be formed via precipitation in the subterranean formation, also referred to herein as in situ precipitation. In some instances, the Ca-MGDA salt particles may be present in a treatment fluid prior to introduction into the subterranean formation (e.g., formed by precipitation at the well site or elsewhere and added to a treatment fluid).

I. Ca-MGDA Salt Particle In Situ Precipitation in Subterranean Formations

Relative to in situ precipitation of Ca-MGDA salt particles, subterranean formations comprising calcium carbonate may be useful a source of calcium. That is, the calcium carbonate etched or dissolved by acidizing a portion of the subterranean formation with a treatment fluid comprising MGDA (or a salt thereof) may increase the calcium concentration in a treatment fluid to greater than about 50,000 ppm and initiate precipitation of the Ca-MGDA salt particles. The Ca-MGDA salt particles may then reduce the fluid flow through the portion of the subterranean formation in which precipitation occurred and divert a portion of the treatment fluid or a subsequent fluid to another portion of the subterranean formation.

In some instances, a treatment fluid suitable for use for in situ precipitation of Ca-MGDA salt particles may comprise an aqueous base fluid, MGDA (or a salt thereof), calcium about 0 ppm to about 50,000 ppm, and about 3% acid or greater by weight of the aqueous base fluid. In some embodiments, the concentration of the MGDA (or a salt thereof) in a treatment fluid may range from a lower limit of about 0.5 M, 0.7 M, or 1 M to an upper limit of about 1.5 M, 1.2 M, or 1 M, and wherein the concentration of the MGDA (or a salt thereof) may range from any lower limit to any upper limit and encompasses any subset therebetween.

In situ precipitation may be useful in fracture acidizing operations or matrix acidizing operations. In fracture acidizing operations, a treatment fluid may be introduced into a wellbore penetrating a subterranean formation at or above the fracture gradient of the subterranean formation (i.e., at a pressure sufficient to create or extend at least one fracture in the subterranean formation). In acidizing operations, a treatment fluid may be introduced into a wellbore penetrating a subterranean formation below the fracture gradient of the subterranean formation.

Aqueous base fluids suitable for use in a treatment fluid described herein may comprise fresh water, saltwater (e.g., water containing one or more salts dissolved therein), brine (e.g., saturated salt water), seawater, or combinations thereof. Generally, the water may be from any source, provided that it does not contain in significant concentrations components that might adversely affect the stability and/or performance of the treatment fluid. In some instances, a treatment fluid described herein may further comprise aqueous-miscible fluids. Examples of suitable aqueous-miscible fluids may include, but are not limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, and the like, any derivative thereof, and any combination thereof.

In some instances, the amount of aqueous-miscible fluids in a treatment fluid may range from a lower limit of about 3% or 5% by weight of the aqueous base fluid to an upper limit of about 8% or 5% by weight of the aqueous base fluid, and wherein the amount of aqueous-miscible fluids in the treatment fluid may range from any lower limit to any upper limit and encompasses any subset therebetween.

Examples of acids suitable for use in conjunction with a treatment fluid described herein may include, but are not limited to, hydrochloric acid, hydrobromic acid, formic acid, acetic acid, chloroacetic acid, dichloroacetic acid, trifluoroacetic acid, sulfuric acid, methanesulfonic acid, phosphoric acid, and any combination thereof.

In some instances, the amount of acid in a treatment fluid may range from a lower limit of about 3% or 5% by weight of the aqueous base fluid to an upper limit of about 15%, 10%, or 5% by weight of the aqueous base fluid, and wherein the amount of acid in the treatment fluid may range from any lower limit to any upper limit and encompasses any subset therebetween.

In some instances, a treatment fluid may comprise calcium prior to introduction into the subterranean formation. The calcium in a treatment fluid (prior to introduction into the subterranean formation) may be any calcium salt that when dissolved in water produces a neutral or acidic solution. Examples of suitable sources of calcium that may be included in a treatment fluid prior to introduction into the subterranean formation may include, but are not limited to, calcium chloride, calcium bromide, calcium nitrate, calcium sulfate, calcium phosphate, and the like, and any combination thereof.

The concentration of calcium treatment fluid prior to introduction into the subterranean formation may, in some embodiments, range from a lower limit of about 0 ppm, 1,000 ppm, 5,000 ppm, or 10,000 ppm to an upper limit of about 50,000 ppm, 40,000 ppm, or 25,000 ppm, and wherein the concentration of calcium may range from any lower limit to any upper limit and encompasses any subset therebetween.

In some embodiments, the rate of precipitation of the Ca-MGDA salt particles may increase at higher temperatures, higher calcium concentrations, and any combination thereof. In some instances, in situ precipitation methods may be advantageously performed where the wellbore has a bottom hole circulating temperature of about 125° F. (about 52° C.) or greater (e.g., about 125° F. to about 400° F. (about 52° C. to about 204° C.)).

II. Ca-MGDA Salt Particles in Treatment Fluids

In some instances, the Ca-MGDA salt particles may be present in a treatment fluid prior to introduction into the subterranean formation. In some instances, a treatment fluid having a pH of about 1.5 to about 5.5 may comprise an aqueous base fluid, Ca-MGDA salt particles, and a suspending aid. The Ca-MGDA salt particles may be placed in a portion of the subterranean formation, thereby reducing fluid flow therethrough; and diverting a portion of the treatment fluid or a subsequent fluid to another portion of the subterranean formation.

Aqueous base fluids suitable for use in conjunction with a treatment fluid that includes Ca-MGDA salt particles before introduction into the subterranean formation include those described above.

In some embodiments, the amount of the Ca-MGDA salt particles in a treatment fluid may range from a lower limit of about 1%, 5%, or 10% by weight of the treatment fluid to an upper limit of about 30%, 25%, or 20% by weight of the treatment fluid, and wherein the concentration of the Ca-MGDA salt particles may range from any lower limit to any upper limit and encompasses any subset therebetween.

Suspending aids suitable for use in conjunction with a treatment fluid that includes Ca-MGDA salt particles before introduction into the subterranean formation include, but are not limited to, polymers (optionally crosslinked with an organic crosslinker), surfactants, and any combination thereof. Examples of polymers may include, but are not limited to, polysaccharides, guar gums (e.g., hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellulose, and carboxymethylhydroxyethylcellulose), xanthan, scleroglucan, succinoglycan, diutan, 2,2'-azobis(2,4-dimethyl valeronitrile), 2,2'-azobis(2,4-dimethyl-4-methoxy valeronitrile), polymers and copolymers of acrylamide ethyltrimethyl ammonium chloride, acrylamide, acrylamido-and methacrylamido-alkyl trialkyl ammonium salts, acrylamidomethylpropane sulfonic acid, acrylamidopropyl trimethyl ammonium chloride, acrylic acid, dimethylaminoethyl methacrylamide, dimethylaminoethyl methacrylate, dimethylaminopropyl methacrylamide, dimethylaminopropylmethacrylamide, dimethyldiallylammonium chloride, dimethylethyl acrylate, fumaramide, methacrylamide, methacrylamidopropyl trimethyl ammonium chloride, methacrylamidopropyldimethyl-n-dodecylammonium chloride, methacrylamidopropyldimethyl-n-octylammonium chloride, methacrylamidopropyltrimethylammonium chloride, methacryloylalkyl trialkyl ammonium salts, methacryloylethyl trimethyl ammonium chloride, methacrylylamidopropyldimethylcetylammonium chloride, N-(3-sulfopropyl)-N-methacrylamidopropyl-N,N-dimethyl ammonium betaine, N,N-dimethylacrylamide, N-methylacrylamide, nonylphenoxypoly(ethyleneoxy)ethylmethacrylate, partially hydrolyzed polyacrylamide, poly 2-amino-2-methyl propane sulfonic acid, polyvinyl alcohol, sodium 2-acrylamido-2-methylpropane sulfonate, quaternized dimethylaminoethylacrylate, quaternized dimethylaminoethylmethacrylate, and the like, any derivative thereof, and any combination thereof. Examples of surfactants may include, but are not limited to, betaines, sulfated or sulfonated alkoxylates, alkyl sulfonates, alkyl aryl sulfonates, $C_{10}$-$C_{20}$ alkyldiphenyl ether sulfonates, ethers of alkylated phenol, sodium dodecylsulfate, alpha olefin sulfonates (e.g., sodium dodecane sulfonate), trimethyl hexadecyl ammonium bromide, sulfosuccinates, taurates, amine oxides, ethoxylated amides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), betaines, modified betaines, alkylamidobetaines (e.g., cocoamidopropyl betaine), quaternary ammonium compounds (e.g., trimethyltallowammonium chloride, trimethylcocoammonium chloride), and the like, any derivative thereof, and any combination thereof. Examples of commercially available surfactants may include, but are not limited to, GASPERM 1000™ (a microemulsion surfactant, available from Halliburton Energy Services, Inc.), GASPERM 1100™ (a microemulsion surfactant, available from Halliburton Energy Services, Inc.), LOSURF 360™ (a nonionic surfactant, available from Halliburton Energy Services, Inc.), and the like, and any combination thereof.

In some instances, the amount of suspending aids in a treatment fluid that includes Ca-MGDA salt particles before introduction into the subterranean formation may range from a lower limit of about 0.1%, 1%, or 3% by weight of the aqueous base fluid to an upper limit of about 20%, 15%, 10%, or 5% by weight of the aqueous base fluid, and wherein the amount of suspending aids in the treatment fluid may range from any lower limit to any upper limit and encompasses any subset therebetween.

The Ca-MGDA salt particles described herein (either in the treatment fluid before introduction into the subterranean formation or formed by in situ precipitation) may, in some embodiments, have a d50 ranging from a lower limit of about 25 microns or 50 microns to an upper limit of about 100 microns, or 75 microns, and wherein the d50 may range from any lower limit to any upper limit and encompasses any subset therebetween. As used herein, the term "d50" refers to a diameter for which 50% by volume of the particles have a smaller diameter.

In some embodiments, a treatment fluid described herein (for in situ precipitation or comprising Ca-MGDA salt particles) may further comprise at least one additive. Example of additives may include, but are not limited to, weighting agents, inert solids, fluid loss control agents, emulsifiers, dispersion aids, corrosion inhibitors, emulsion thinners, emulsion thickeners, viscosifying agents, gelling agents, surfactants, particulates, proppants, gravel particulates, lost circulation materials, breakers, biocides, crosslinkers, stabilizers, chelating agents, scale inhibitors, gas hydrate inhibitors, mutual solvents, oxidizers, reducers, friction reducers, clay stabilizing agents, and the like, and any combination thereof.

In some embodiments, the Ca-MGDA salt particles described herein may be degraded (e.g., via dissolution) by adjusting the pH to greater than about 5.5. As such, in some embodiments, after placing or in situ precipitation of the Ca-MGDA salt particles, the Ca-MGDA salt particles may be contacted by second treatment fluid having a pH of about 5.5 or greater, so as to degrade (e.g., dissolve) at least a portion of the particles and increase fluid flow through the portion of the subterranean formation in which the Ca-MGDA salt particles reside.

In various embodiments, systems configured for delivering a treatment fluid described herein to a downhole location are described. In various embodiments, the systems can comprise a pump fluidly coupled to a tubular, the tubular containing a treatment fluid comprising an aqueous base fluid, MGDA (or a salt thereof), calcium about 0 ppm to about 50,000 ppm, and about 3% acid or greater by weight of the aqueous base fluid. In various embodiments, the systems can comprise a pump fluidly coupled to a tubular, the tubular containing a treatment fluid having a pH of about 1.5 to about 5.5 and comprising an aqueous base fluid, Ca-MGDA salt particles, and a suspending aid.

The pump may be a high-pressure pump in some embodiments. As used herein, the term "high pressure pump" will refer to a pump that is capable of delivering a fluid downhole at a pressure of about 1000 psi or greater. A high-pressure pump may be used when it is desired to introduce the treatment fluid to a subterranean formation at or above a fracture gradient of the subterranean formation, but it may also be used in cases where fracturing is not desired. In some embodiments, the high-pressure pump may be capable of fluidly conveying particulate matter, such as proppant particulates, into the subterranean formation. Suitable high-pressure pumps will be known to one having ordinary skill in the art and may include, but are not limited to, floating piston pumps and positive displacement pumps.

In other embodiments, the pump may be a low-pressure pump. As used herein, the term "low pressure pump" will refer to a pump that operates at a pressure of about 1000 psi or less. In some embodiments, a low-pressure pump may be fluidly coupled to a high-pressure pump that is fluidly coupled to the tubular. That is, in such embodiments, the low-pressure pump may be configured to convey the treatment fluid to the high-pressure pump. In such embodiments, the low-pressure pump may "step up" the pressure of the treatment fluid before it reaches the high-pressure pump.

In some embodiments, the systems described herein can further comprise a mixing tank that is upstream of the pump and in which the treatment fluid is formulated. In various embodiments, the pump (e.g., a low-pressure pump, a high-pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

FIG. 1 shows an illustrative schematic of a system that can deliver treatment fluids of the present invention to a downhole location, according to one or moreembodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the present invention may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. In some instances, tubular 16 may have a plurality of orifices (not shown) through which the treatment fluid of the present disclosure may enter the wellbore 22 proximal to a portion of the subterranean formation 18 to be treated. In some instances, the wellbore 22 may further comprise equipment or tools (not shown) for zonal isolation of a portion of the subterranean formation 18 to be treated.

Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Some embodiments disclosed herein include a method that involves introducing a treatment fluid into a wellbore penetrating a subterranean formation, wherein the treatment fluid comprises an aqueous base fluid, MGDA or salt thereof, and an acid in an amount of about 3% or greater by weight of the aqueous base fluid; acidizing a first portion of the subterranean formation comprising calcium carbonate resulting in a concentration of calcium in the treatment fluid that exceeds about 50,000 ppm; precipitating a plurality of particles that comprise a Ca-MGDA salt in the first portion of the subterranean formation, thereby reducing fluid flow therethrough; and diverting a portion of the treatment fluid or a subsequent treatment fluid from the first portion of the subterranean formation to a second portion of the subterranean formation. Some embodiments may further include at least one of the following additional elements in any combination: Element 1: the method further including contacting the plurality of particles with a second treatment fluid having a pH of about 5.5 or greater; and dissolving at least a portion of the plurality of particles, thereby increasing fluid flow through the portion of the subterranean formation; Element 2: wherein the treatment fluid further comprises calcium before introducing the treatment fluid into the wellbore; Element 3: Element 2 wherein the calcium in the treatment fluid before introducing the treatment fluid into the wellbore is from a calcium salt comprising at least one selected from the group consisting of calcium chloride, calcium bromide, calcium nitrate, calcium sulfate, calcium phosphate, and any combination thereof; Element 4: Element 2 wherein the calcium is at a concentration of about 10,000 ppm to about 50,000 ppm in the treatment fluid before introducing the treatment fluid into the wellbore; Element 5: wherein the MGDA or salt thereof is at a concentration of about 0.5 M to about 1.5 M in the treatment fluid; Element 6: wherein the wellbore has a bottom hole circulating temperature of about 125° F. or greater (e.g., about 125° F. to about 400° F.); Element 7: wherein the plurality of particles have a d50 of about 25 microns to about 100 microns; Element 8: wherein introducing the treatment fluid into the wellbore is at a pressure sufficient to create or extend at least one fracture in the subterranean formation; Element 9: wherein introducing the treatment fluid into the wellbore is below a fracture gradient pressure of the subterranean formation; Element 10: wherein the treatment fluid further comprises an aqueous miscible fluid; Element 11: Element 10 wherein the aqueous miscible fluid is at a concentration of about 3% to about 8% by weight of the treatment fluid; and Element 12: wherein the amount of the acid is about 3% to about 15% by weight of the aqueous base fluid. By way of non-limiting example, exemplary combinations may include, but are not limited to, Element 5 in combination with at least one of Elements 2-4; Element 10 (and optionally Element 11) in combination with at least one of Elements 2-4; Element 12 in combination with at least one of Elements 2-4; at least one of Elements 5-6 in combination with at least one of Elements 3-5 and 10-12; Element 8 or 9 in combination with any of the foregoing; Element 8 or 9 in combination with at least one of Elements 2-5 and 10-12; Element 1 in combination with any of the foregoing; Element 1 in combination with at least one of Elements 2-7 and 10-12; and Element 8 or 9 in combination with Element 1.

Some embodiments disclosed herein include a system that includes a pump fluidly coupled to a tubular, the tubular containing a treatment fluid that comprises an aqueous base fluid, MGDA or salt thereof, 0 ppm to about 50,000 ppm calcium, and acid in an amount of about 3% or greater by weight of the aqueous base fluid. In some instances, the treatment fluid may further include at least one of Elements 2-5, 7, and 10-11 as described above.

Some embodiments disclosed herein include a method that involves introducing a treatment fluid into a wellbore penetrating a subterranean formation, wherein the treatment fluid has a pH of about 1.5 to about 5.5 and comprises an aqueous base fluid, a suspending aid, and a plurality of particles that comprise a Ca-MGDA salt; placing the plurality of particles in a portion of the subterranean formation, thereby reducing fluid flow therethrough; and diverting a portion of the treatment fluid or a subsequent treatment fluid from the portion of the subterranean formation to a second portion of the subterranean formation. Some embodiments may further include at least one of the following additional elements in any combination: Element 12: the method further including contacting the plurality of particles with a second treatment fluid having a pH of about 5.5 or greater; and dissolving at least a portion of the plurality of particles, thereby increasing fluid flow through the portion of the subterranean formation; Element 13: wherein the plurality of particles have a d50 of about 25 microns to about 100 microns; Element 14: wherein the plurality of particles are at about 1% to about 30% by weight of the treatment fluid; Element 15: wherein the suspending aid comprises at least one of a polymer and a surfactant; Element 16: wherein the suspending aid is at about 0.1% to about 20% by weight of the aqueous base fluid; Element 17: wherein the treatment fluid further comprises an aqueous miscible fluid; Element 18: Element 17 wherein the aqueous miscible fluid is at a concentration of about 3% to about 8% by weight of the treatment fluid; and Element 19: wherein the wellbore has a bottom hole circulating temperature of about 125° F. or greater (e.g., about 125° F. to about 400° F.). By way of non-limiting example, exemplary combinations may include, but are not limited to, Element 13 in combination with Element 14; Element 15 in combination with Element 16; Element 13 in combination with at least one of Elements 15-16; Element 14 in combination with at least one of Elements 15-16; Element 13 in combination with at least one of Elements 17-19; Element 14 in combination with at least one of Elements 17-19; Element 12 in combination with any of the foregoing; and Element 12 in combination with one of Elements 13-19.

Some embodiments disclosed herein include a treatment fluid having a pH of about 1.5 to about 5.5 and comprising an aqueous base fluid, a plurality of particles that comprise a Ca-MGDA salt, and a suspending aid. In some instances, the treatment fluid may further include at least one of Elements 13-18 as described above. Some embodiments disclosed herein include a system that includes a pump fluidly coupled to a tubular, the tubular containing any of the foregoing treatment fluids.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

To facilitate a better understanding of the embodiments of the present invention, the following examples of preferred or representative embodiments are given. In no way should the following examples be read to limit, or to define, the scope of the invention.

EXAMPLES

Example 1

Two samples of Ca-MGDA salt particles were prepared by first mixing 0.6 M MGDA (TRILON M®, MGDA tri-sodium salt, available from BASF), 36% HCl, and water in the amounts provided in Table 1 to achieve a total volume of 250 mL. After mixing, the sample pH was measured (pH$_A$ in Table 1). Then, calcium carbonate was added in the sample in the amount reported in Table 1 resulting in pH$_B$ in Table 1. The solution was then neutralized with sodium hydroxide to pH$_C$. As the pH of the sample increased with the addition of the sodium hydroxide, a white precipitate was observed. Upon visual inspection as the pH further increased, additional white precipitate formed and the viscosity of the sample increased. As the pH approached about 5.5, the solution became clear. Upon leaving the samples at about pH 5.5 undisturbed for about 30 minutes, the sample visually began to gel and increase in viscosity. Upon visual inspection under agitation, the gelled-like characteristics became a thin, non-viscous liquid that upon standing would return to the original state (viscous fluid).

TABLE 1

| Sample | 0.6M MGDA (mL) | HCl (mL) | Water (mL) | pH$_A$ | CaCO$_3$ (g) | pH$_B$ | pH$_C$ |
|---|---|---|---|---|---|---|---|
| 1 | 77.50 | 60.00 | 112.50 | −0.8 | 17.06 | 1.07 | 5.45 |
| 2 | 77.50 | 50.00 | 122.50 | 0.35 | 12.46 | 1.27 | 5.50 |

Then, Sample 1 was filtered through a 5 micron filter (Sample 1A) and a 10 micron filter (Sample 1B). The filtrates of Sample 1A and 1B, the filtered particles of Sample 1A and 1B, and Sample 2 with no filtration were analyzed with variety of methods. Table 2 provides the results of a pH test and elemental analysis via an inductively coupled plasma method. Table 3 provides the results of elemental analysis via energy dispersive x-ray fluorescence (EDXRF), the values are averages of three runs on each sample.

TABLE 2

| Sample | Ca (ppm) | Na (ppm) | pH |
|---|---|---|---|
| 1A | 22522 | 64993 | 5.36 |
| 1B | 23437 | 65095 | 5.30 |
| 2 | 18615 | 65359 | 5.63 |

TABLE 3

| Element | 1-5 micron filtrate | 1-10 micron filtrate | 2 |
|---|---|---|---|
| C | 23.7% | 34.1% | 36.2% |
| O | 36.6% | 15.0% | 42.5% |
| Na | 12.3% | 19.5% | 13.6% |
| Cl | 12.6% | 28.1% | 5.9% |
| Ca | 14.9% | 3.4% | 1.7% |

Figure 2:
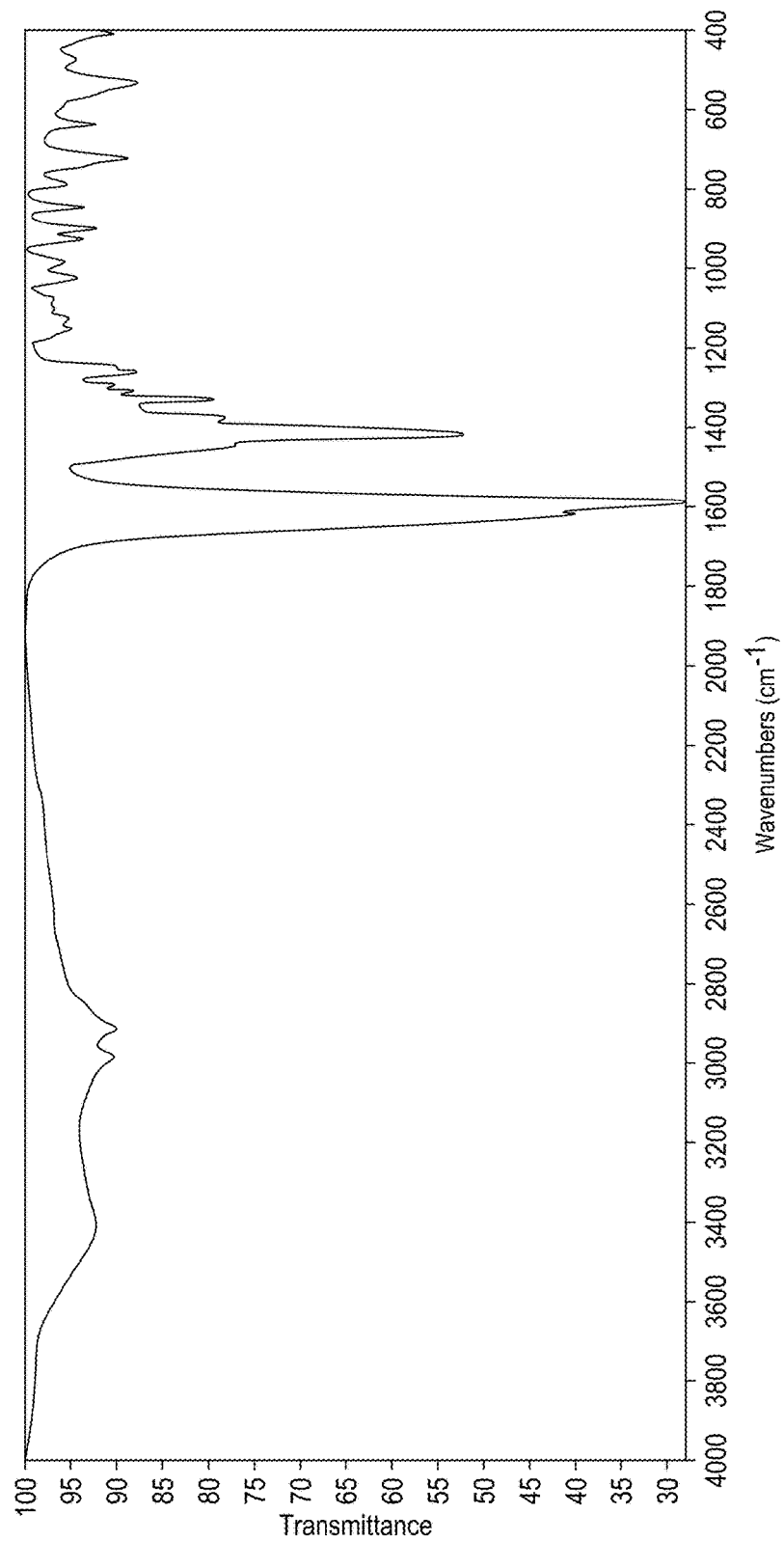
FIG. 2 provides an FT-IR spectrum of Ca-MGDA salt particles according to at least some embodiments described herein.
Figure 3:
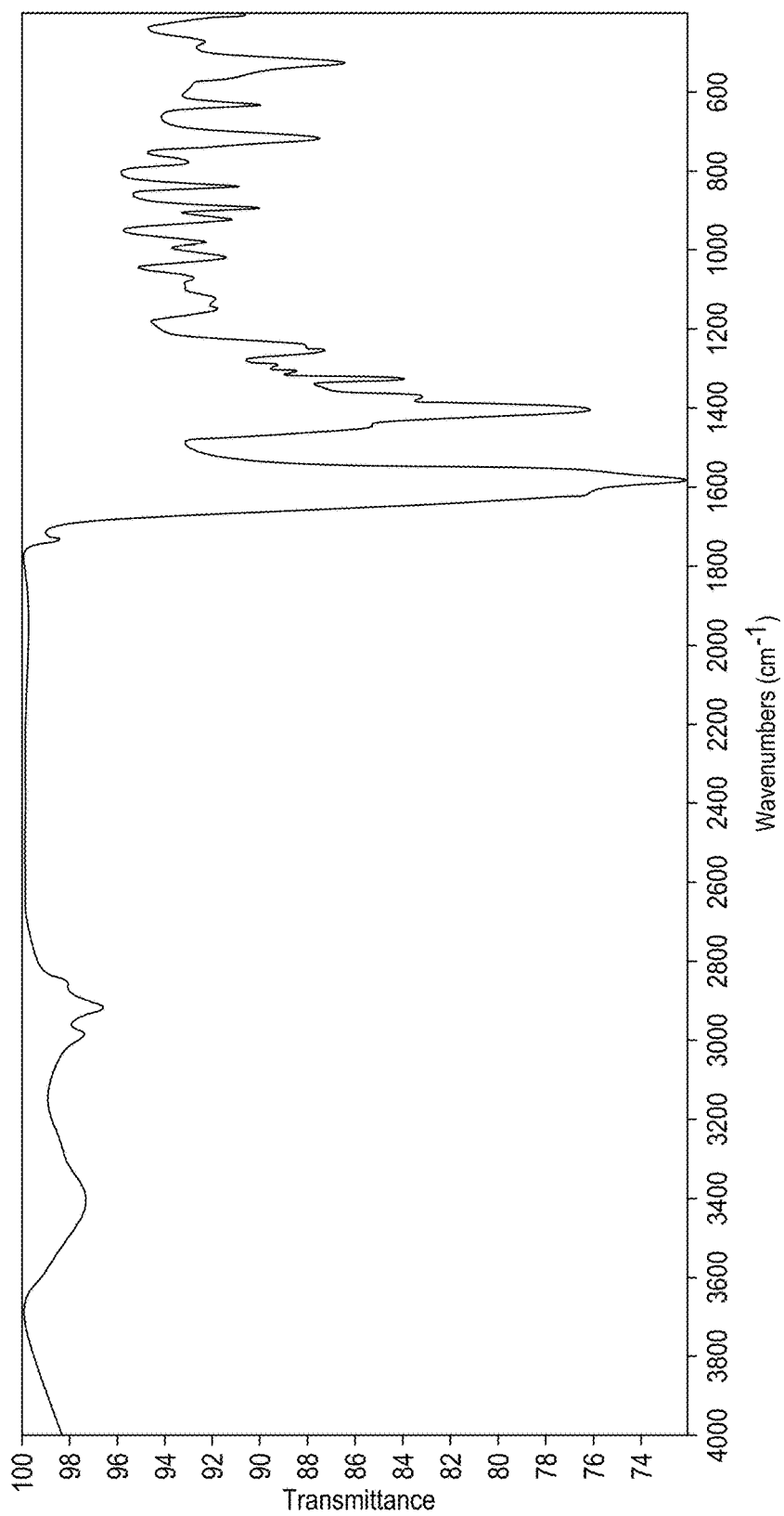
FIG. 3 provides an FT-IR spectrum of Ca-MGDA salt particles according to at least some embodiments described herein.
Figure 4:
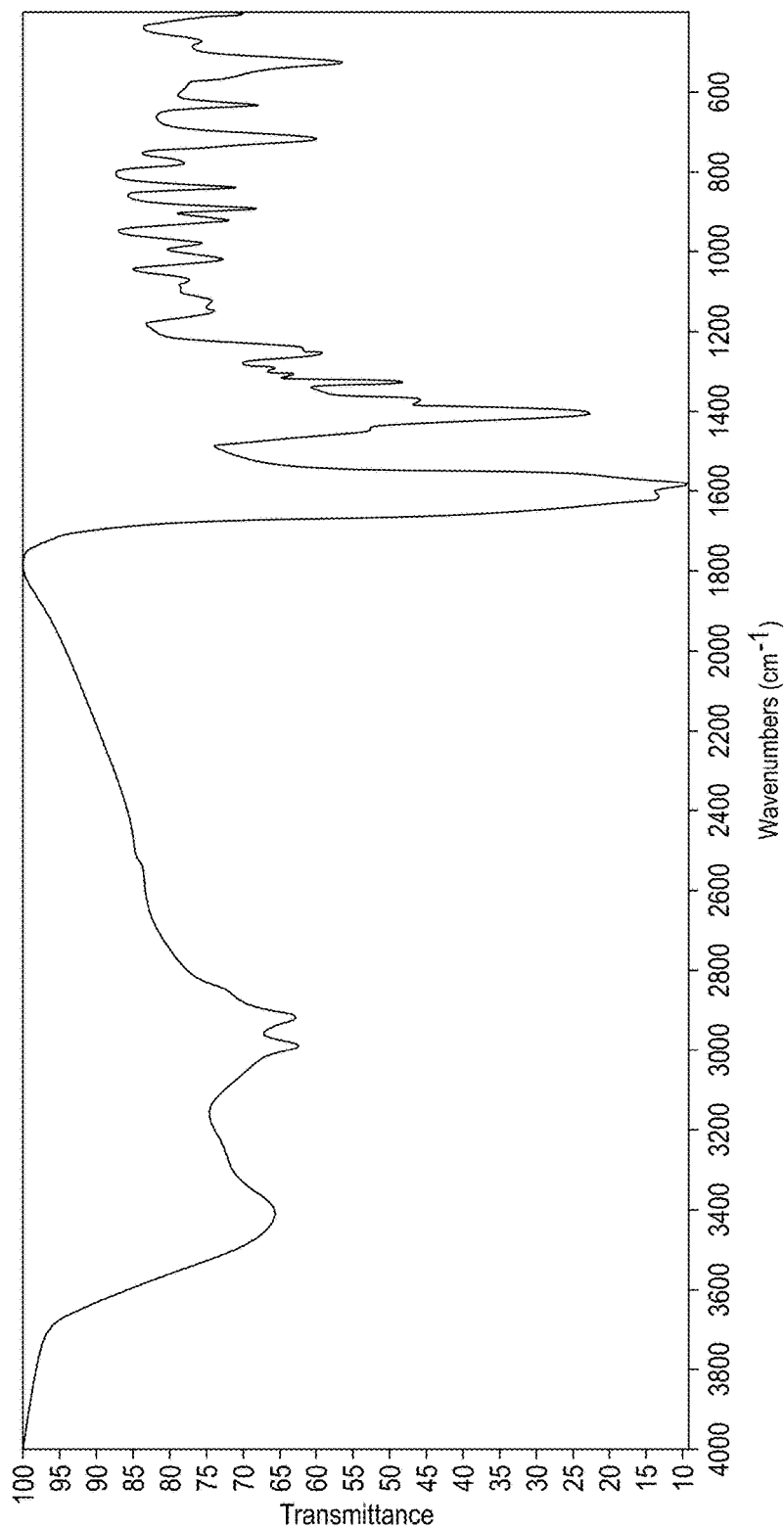
FIG. 4 provides an FT-IR spectrum of Ca-MGDA salt particles according to at least some embodiments described herein.

FIGS. 2-4 provide FT-IR spectra collected with attenuated total reflectance ("ATR") for Sample 1A filtered particles, Sample 1B filtered particles, and Sample 2. The samples were smeared on silver bromide crystals for analysis. The presence of the two carbonyl peaks at about 1600 cm$^{-1}$ and the near loss of broad hydroxyl groups at about 3300 cm$^{-1}$ may indicate that the carboxyl groups are chelated to calcium, resulting in an ionic salt.

Figure 5:
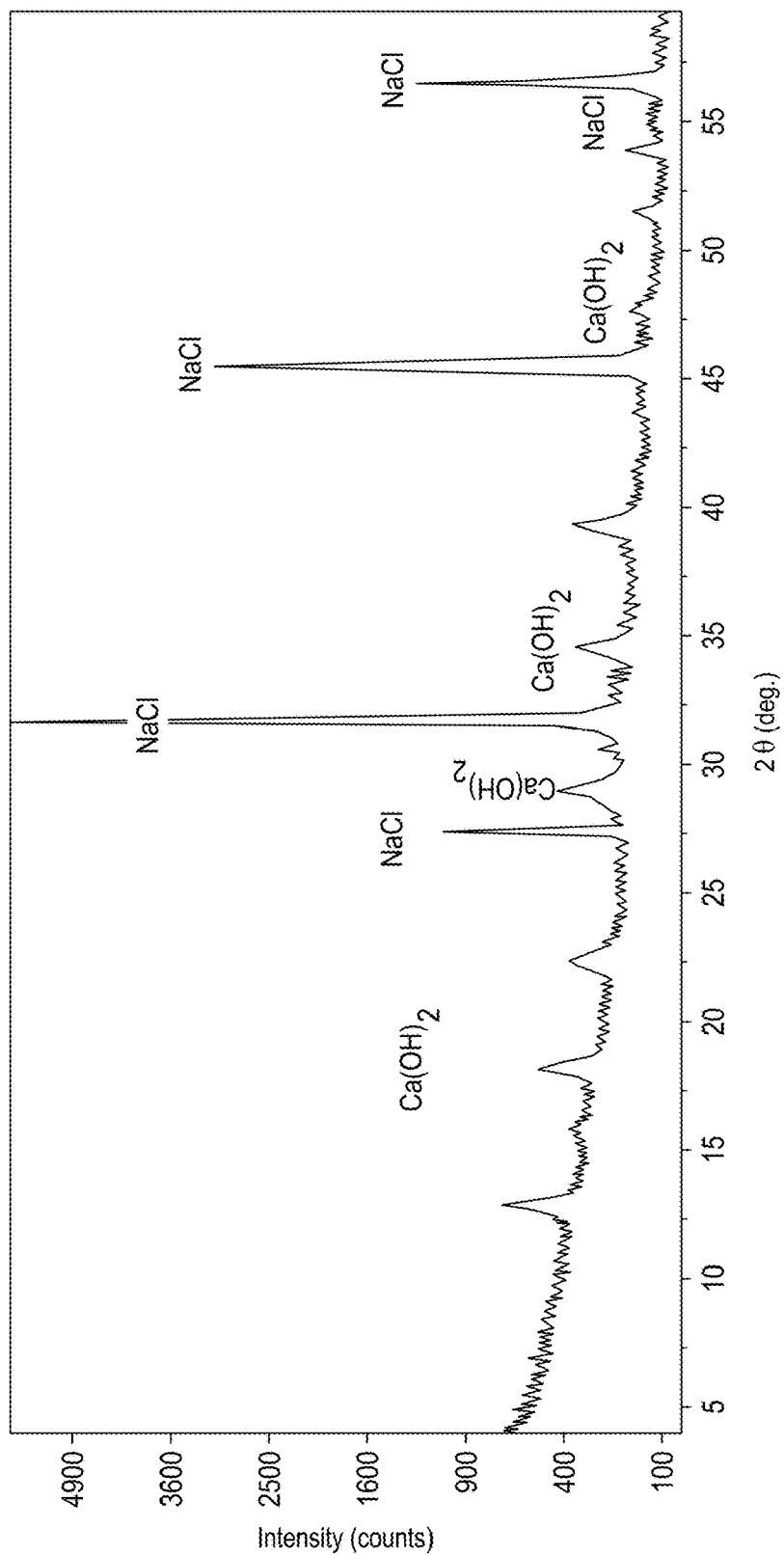
FIG. 5 provides XRD spectra of Ca-MGDA salt particles according to at least some embodiments described herein.
Figure 6:
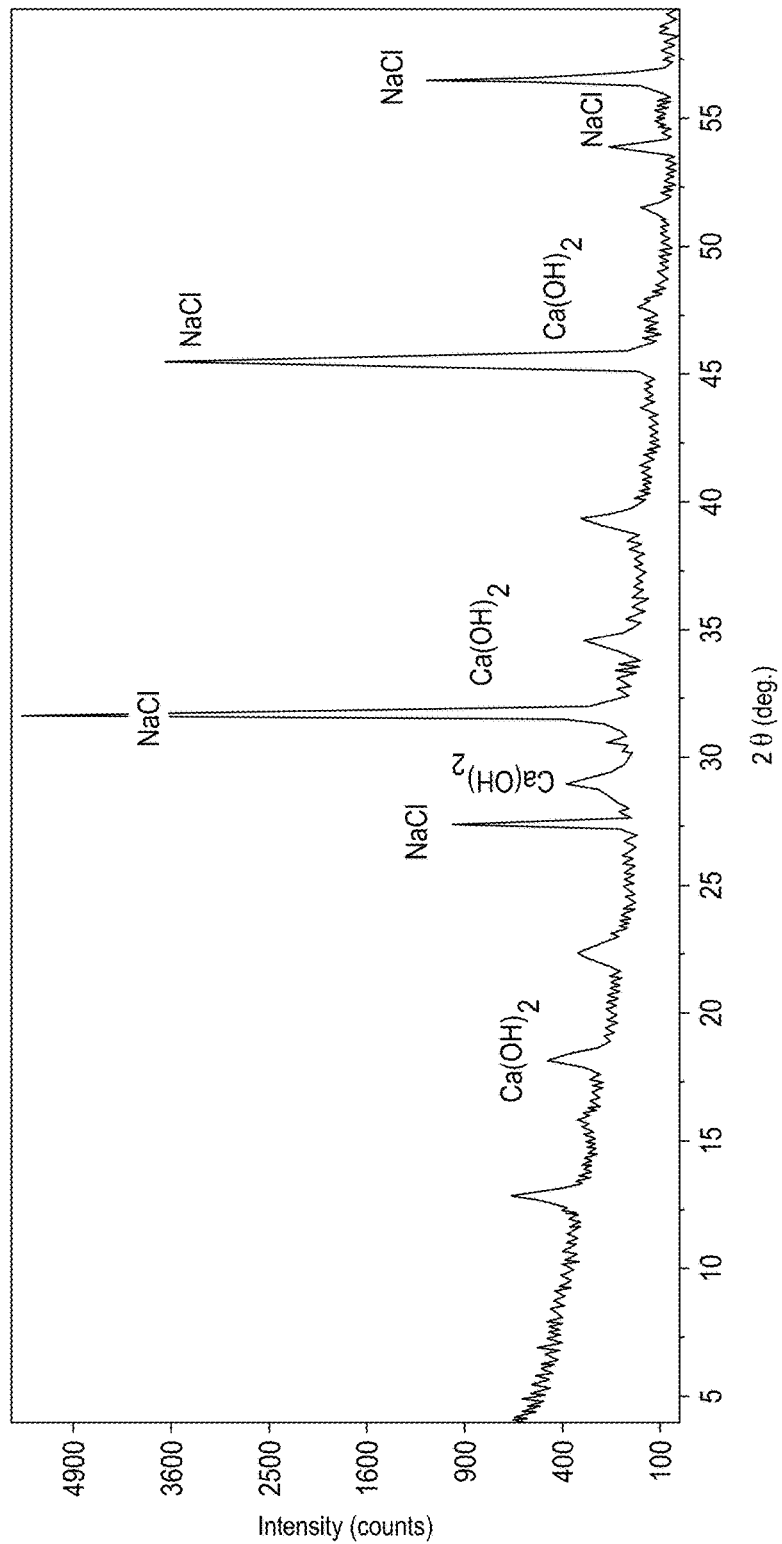
FIG. 6 provides XRD spectra of Ca-MGDA salt particles according to at least some embodiments described herein.
Figure 7:
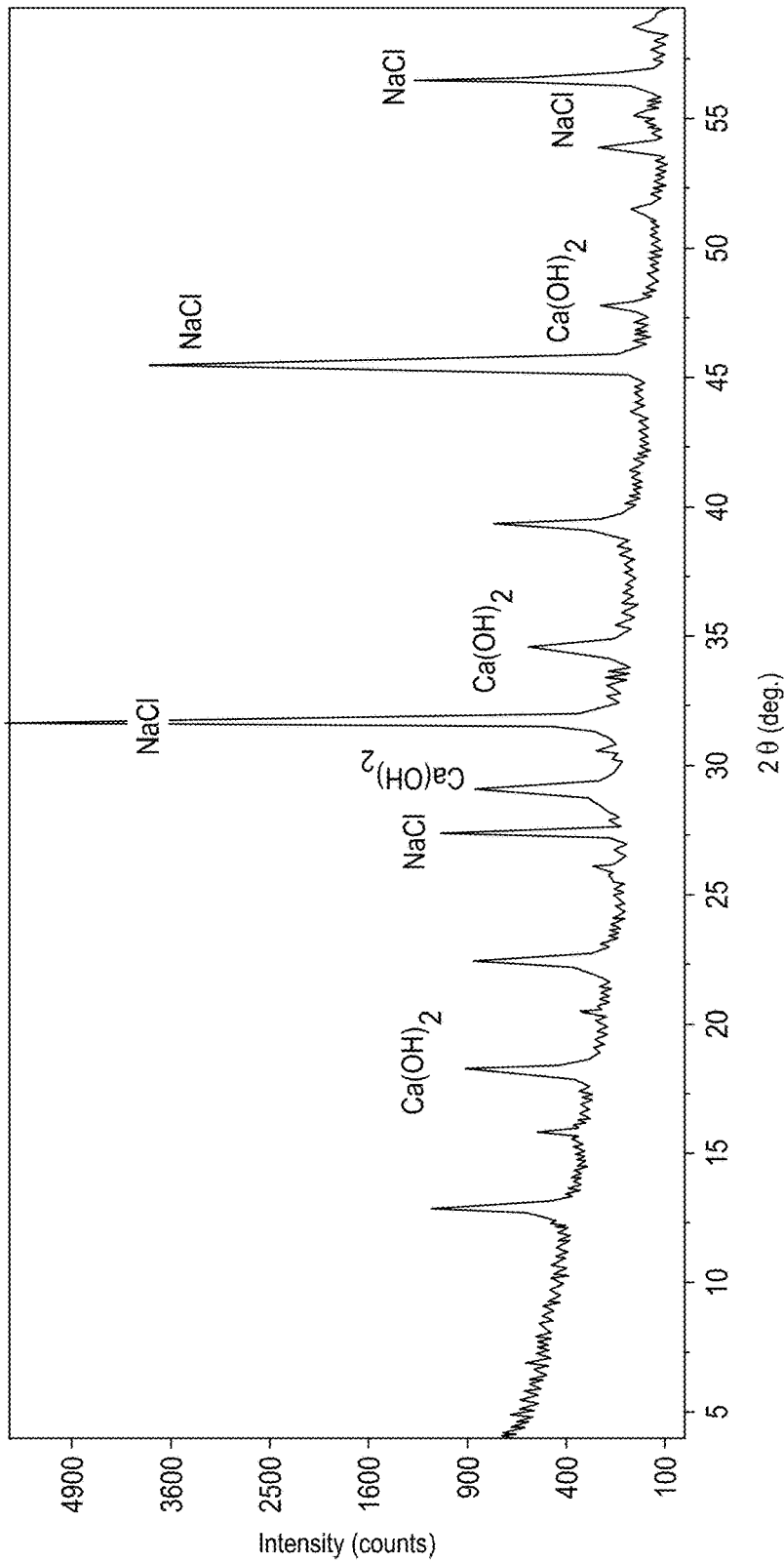
FIG. 7 provides XRD spectra of Ca-MGDA salt particles according to at least some embodiments described herein.

The x-ray diffraction ("XRD") spectra of Sample 1A filtered particles is provided in FIG. 5, Sample 1B filtered particles in FIG. 6, and Sample 2 in FIG. 7. The samples were oven dried at about 90° C. to about 100° C. prior to XRD analysis. The diffraction spectra for all samples are consistent and show the presence of NaCl salt and an organic compound that XRD cannot identify.

Figure 8:
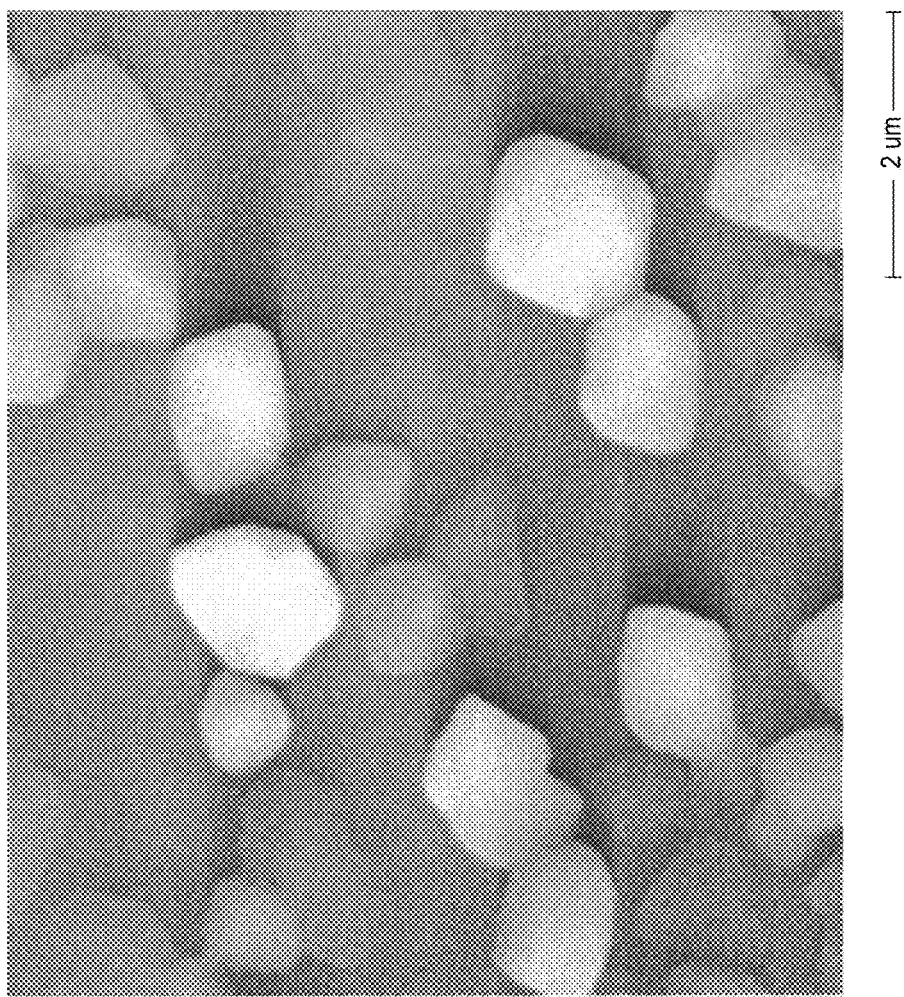
FIG. 8 provides a scanning electron micrograph of Ca-MGDA salt particles according to at least some embodiments described herein.

FIG. 8 provides a scanning electron micrograph Sample 1A filtered particles showing the Ca-MGDA salt particles with diameter of about 1-2 microns.

Figure 9:
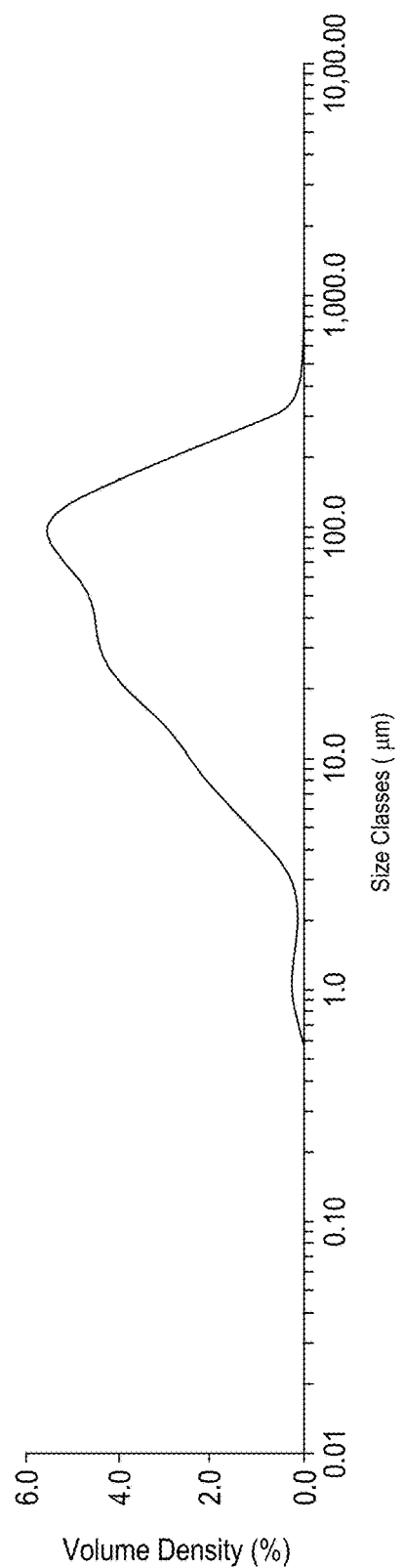
FIG. 9 provides particle size distribution of Ca-MGDA salt particles according to at least some embodiments described herein.
Figure 10:
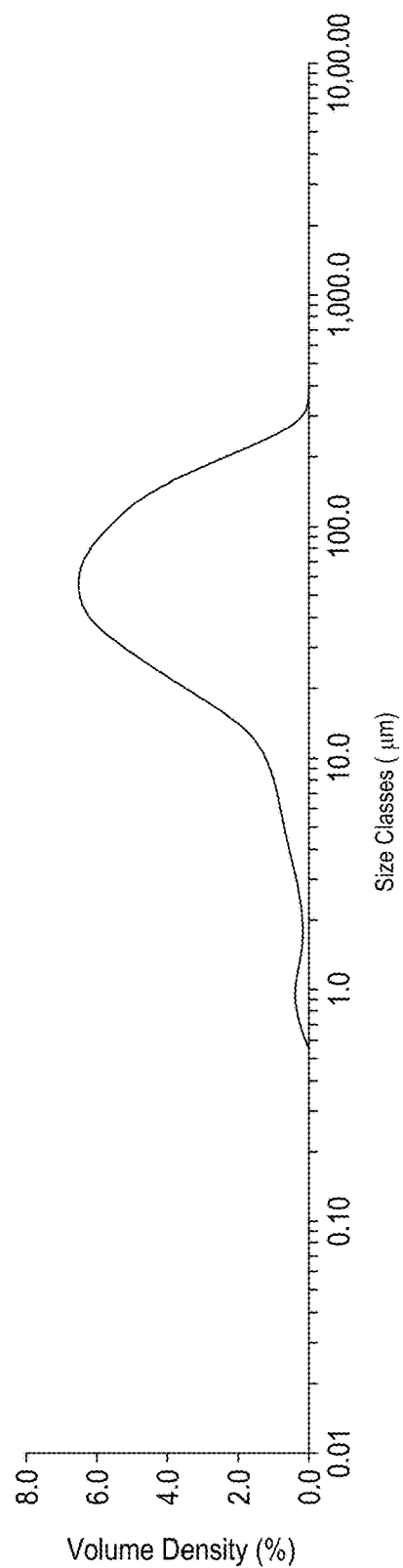
FIG. 10 provides particle size distribution of Ca-MGDA salt particles according to at least some embodiments described herein.

FIGS. 9-10 provide the particle size distribution for Sample 1B filtered particles and Sample 2, respectively. Table 4 provides the corresponding reported as the d10, d50, and d90 for these samples.

TABLE 4

| Sample | d10 | d50 | d90 |
|---|---|---|---|
| 1B filtered particles | 9 microns | 47 microns | 156 microns |
| 2 | 12 microns | 47 microns | 133 microns |

A 1×4 inch white aloxite core was placed in a custom-built Hassler core holder for testing the core plugging ability of the Ca-MGDA particles. The test was performed with 2,500 psi of confining stress applied to the core and a backpressure of 1,000 psi at a temperature of 125° F. with a flow rate of 10 mL/min, 2.5 mL/min, and 1 mL/min with Sample 1 (the flow rate was decreased as pressure went up). The initial permeability of the core was 1 Darcy but after injecting Sample 1, the permeability dropped to 0.5 mD, which indicates plugging of the core.

Example 2

A solution of 0.6M MGDA prepared in HCl having about 3% to about 5% acid by weight of water. Two samples were prepared by adding CaCO$_3$ (Sample 3: 15 g; Sample 4: 18.2 g) to 250 mL of the acidic MGDA fluid gradually. For Sample 3, the pH increased but did not form particulates. For Sample 4 after addition of the CaCO$_3$, the pH was increased to about 5.4 with the addition of NaOH, where the precipitation of Ca-MGDA salt particles was observed. Sample 4 was allowed to stand at room temperature for about 16 hours, where increased precipitation was observed.

Figure 11:
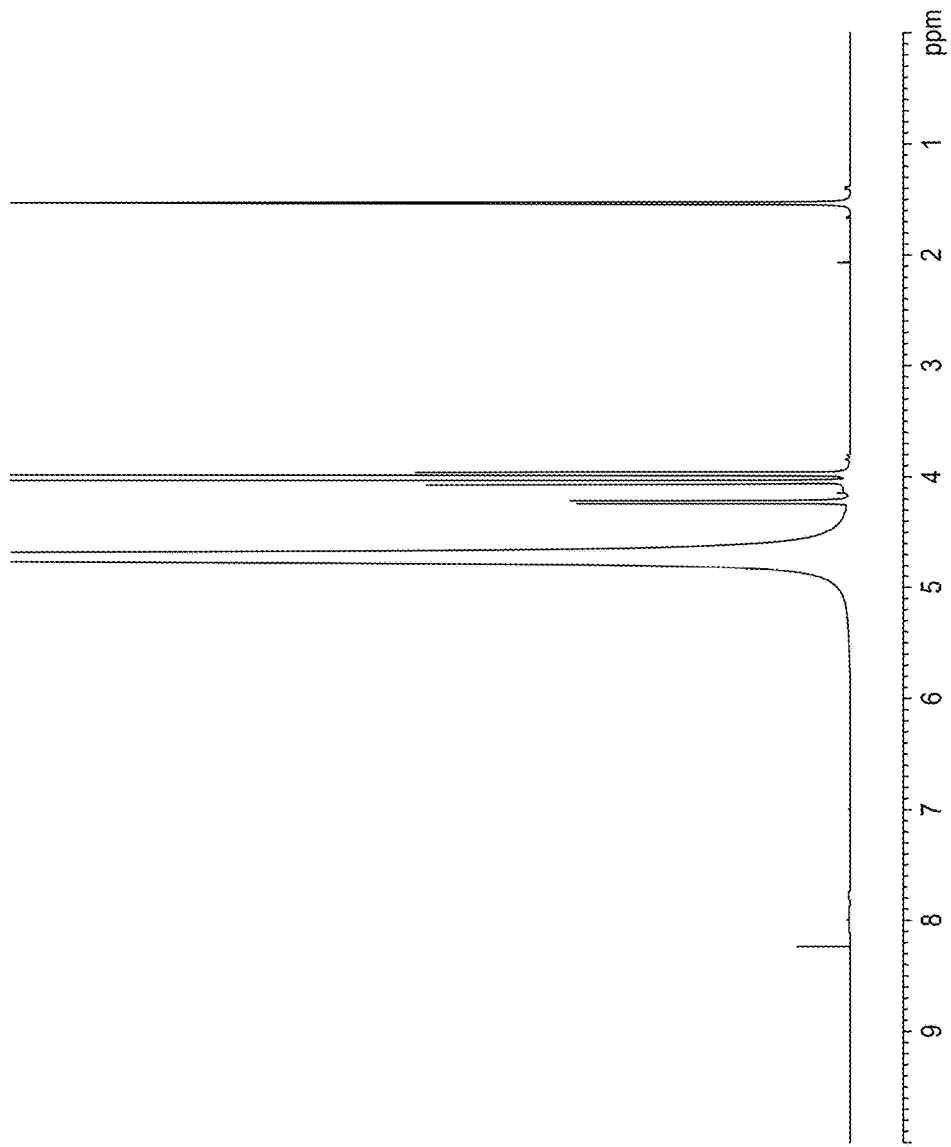
FIG. 11 provides nuclear magnetic resonance spectra of a fluid during the production of Ca-MGDA salt particles according to at least some embodiments described herein.
Figure 12:
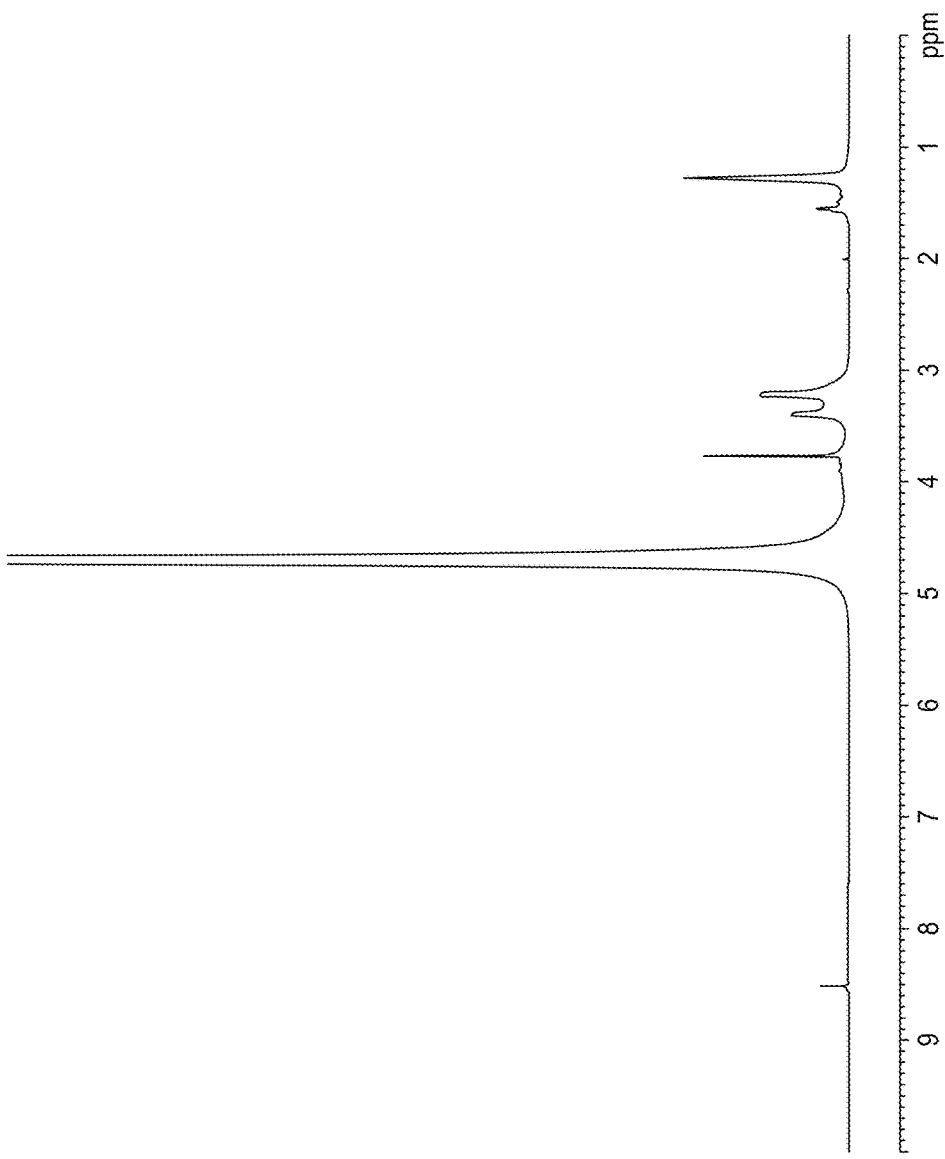
FIG. 12 provides nuclear magnetic resonance spectra of a fluid during the production of Ca-MGDA salt particles according to at least some embodiments described herein.
Figure 13:
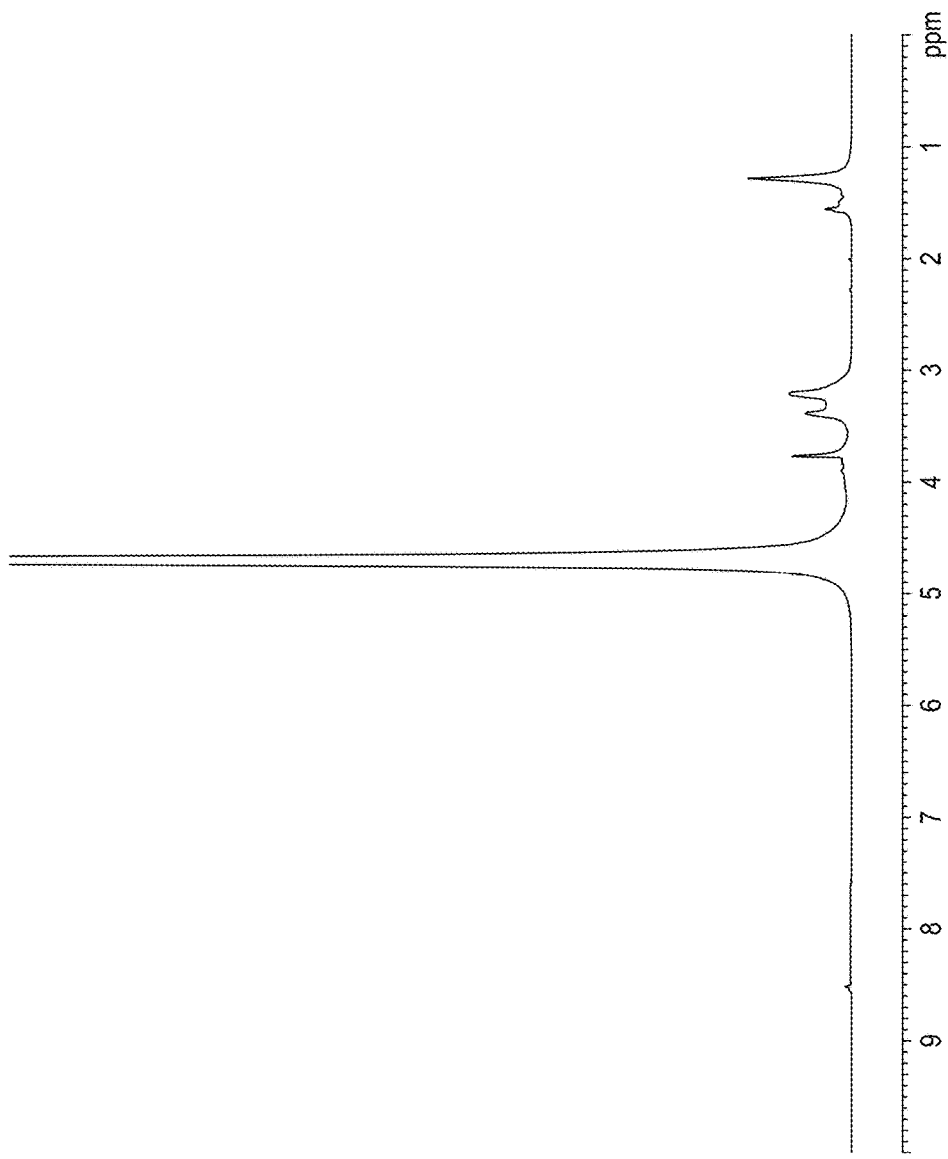
FIG. 13 provides nuclear magnetic resonance spectra of a fluid during the production of Ca-MGDA salt particles according to at least some embodiments described herein.
Figure 14:
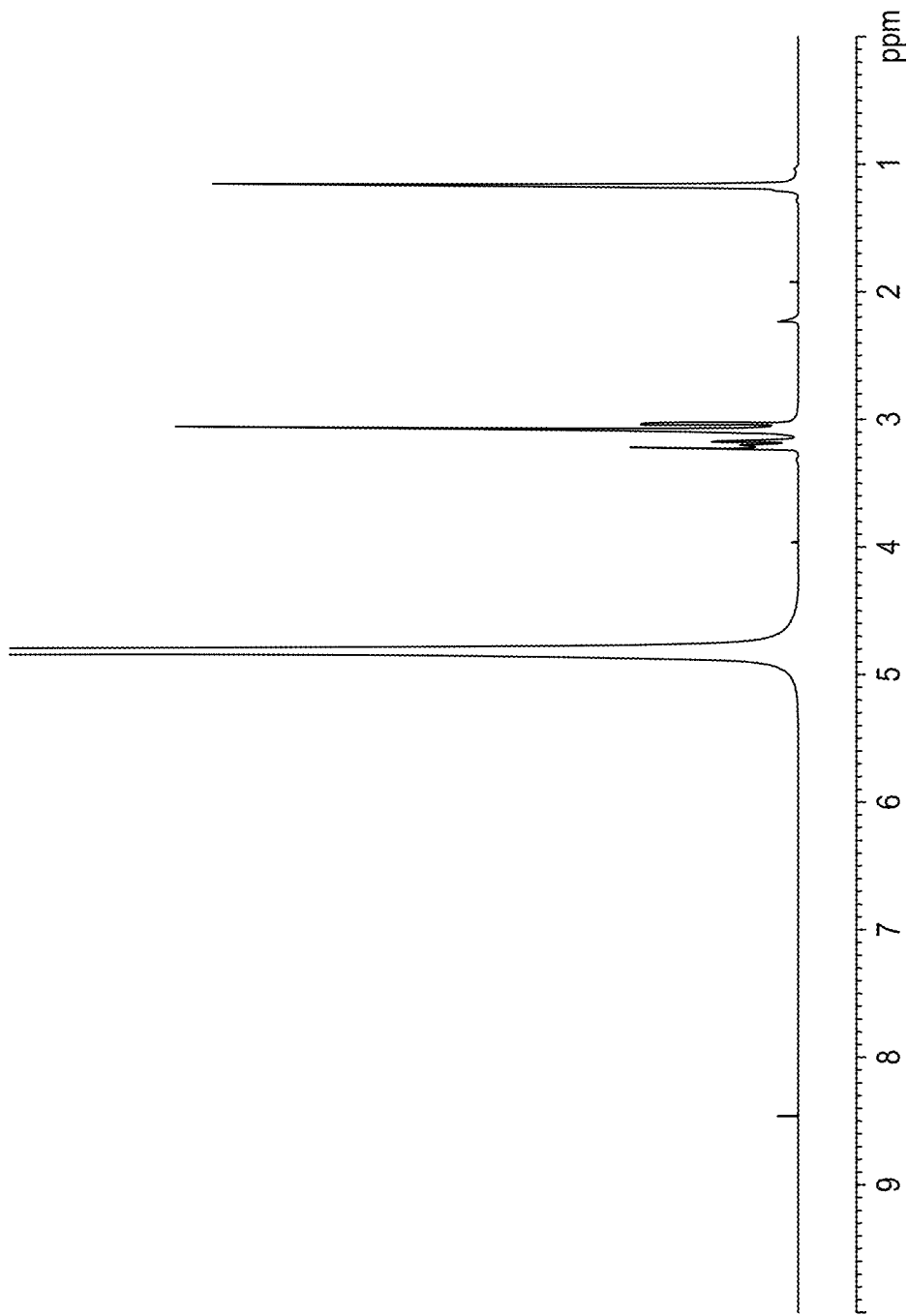
FIG. 14 provides nuclear magnetic resonance spectra of MGDA.

NMR was performed on Sample 3 (FIG. 11), Sample 4 after precipitation (FIG. 12), and Sample 4 after 16 hours (FIG. 13). Sample 3 shows signals corresponding to the CH$_3$ (~1.5 ppm), CH$_2$ (~3.9-4 ppm), and CH (~4.2-4.3 ppm) of soluble Ca-MGDA. For reference, the Na-MGDA is the TRILON M® spectra of FIG. 14. Counterion exchange from Na to Ca shifted the signals to higher ppm.

Comparison of Sample 4 initial and Sample 4 after 16 hours to Sample 3, the signals have shifted to lower ppm, weakened, and broadened, which is consistent with particles forming (ionic salt solution). Further, in comparing Sample 4 initial to Sample 4 after 16 hours, the signals shift, weaken, and broaden further with additional time, which is believe to be a result of additional particle formation and particle agglomeration.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
   introducing a treatment fluid into a wellbore penetrating a subterranean formation, wherein the treatment fluid comprises an aqueous base fluid, a methylglycine diacetic acid (MGDA) or salt thereof, and a second acid in an amount of about 3% or greater by weight of the aqueous base fluid;
   acidizing a first portion of the subterranean formation comprising calcium carbonate resulting in a concentration of calcium in the treatment fluid that exceeds about 50,000 ppm;
   adjusting a pH of the treatment fluid to be about 1.5 to about 5.5, thereby precipitating a plurality of particles that comprise a Ca-MGDA salt in the first portion of the subterranean formation, thereby reducing fluid flow therethrough; and
   diverting a portion of the treatment fluid or a subsequent treatment fluid from the first portion of the subterranean formation to a second portion of the subterranean formation.

2. The method of claim 1 further comprising:
   contacting the plurality of particles with a second treatment fluid having a pH of about 5.5 or greater; and
   dissolving at least a portion of the plurality of particles, thereby increasing fluid flow through the portion of the subterranean formation.

3. The method of claim 1, wherein the treatment fluid further comprises calcium before introducing the treatment fluid into the wellbore.

4. The method of claim 3, wherein the calcium in the treatment fluid before introducing the treatment fluid into the wellbore is from a calcium salt comprising at least one selected from the group consisting of calcium chloride, calcium bromide, calcium nitrate, calcium sulfate, calcium phosphate, and any combination thereof.

5. The method of claim 3, wherein the calcium is at a concentration of about 10,000 ppm to about 50,000 ppm in the treatment fluid before introducing the treatment fluid into the wellbore.

6. The method of claim 1, wherein the MGDA or salt thereof is at a concentration of about 0.5 M to about 1.5 M in the treatment fluid.

7. The method of claim 1, wherein the wellbore has a bottom hole circulating temperature of about 125° F. or greater.

8. The method of claim 1, wherein the plurality of particles have a d50 of about 25 microns to about 100 microns.

9. The method of claim 1, wherein introducing the treatment fluid into the wellbore is at a pressure sufficient to create or extend at least one fracture in the subterranean formation.

10. A method comprising:
    introducing a treatment fluid into a wellbore penetrating a subterranean formation, wherein the treatment fluid comprises an aqueous base fluid, a suspending aid, and a plurality of particles that comprise a Ca-methylglycine diacetic acid (MGDA) salt, wherein the plurality of particles that comprise the Ca-MGDA salt are precipitated due to the treatment fluid having a pH of about 1.5 to about 5.5;
    placing the plurality of particles in a portion of the subterranean formation, thereby reducing fluid flow therethrough; and
    diverting a portion of the treatment fluid or a subsequent treatment fluid from the portion of the subterranean formation to a second portion of the subterranean formation.

11. The method of claim 10 further comprising:
    contacting the plurality of particles with a second treatment fluid having a pH of about 5.5 or greater; and
    dissolving at least a portion of the plurality of particles, thereby increasing fluid flow through the portion of the subterranean formation.

12. The method of claim 10, wherein the plurality of particles have a d50 of about 25 microns to about 100 microns.

13. The method of claim 10, wherein the plurality of particles are at about 1% to about 30% by weight of the treatment fluid.

14. The method of claim 10, wherein the suspending aid comprises at least one of a polymer and a surfactant.

15. The method of claim 10, wherein the suspending aid is at about 0.1% to about 20% by weight of the aqueous base fluid.

16. The method of claim 10, wherein the treatment fluid further comprises an aqueous-miscible fluid.

17. A system comprising:
    a pump fluidly coupled to a tubular;
    the tubular containing a treatment fluid that comprises an aqueous base fluid, a methylglycine diacetic acid (MGDA) or salt thereof, up to about 50,000 ppm calcium, and a second acid in an amount of about 3% or greater by weight of the aqueous base fluid, wherein a pH of the treatment fluid is about 1.5 to about 5.5, and includes a plurality of particles that comprise a Ca-methylglycine diacetic acid (MGDA) salt.

* * * * *